United States Patent
Ooshima et al.

(10) Patent No.: US 12,488,917 B2
(45) Date of Patent: Dec. 2, 2025

(54) ELECTRONIC COMPONENT

(71) Applicant: Murata Manufacturing Co., Ltd., Nagaokakyo (JP)

(72) Inventors: Tomoya Ooshima, Nagaokakyo (JP); Yuuta Hoshino, Nagaokakyo (JP); Koichi Yamada, Nagaokakyo (JP); Miki Sasaki, Nagaokakyo (JP); Mitsuru Nakano, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 41 days.

(21) Appl. No.: 18/400,627

(22) Filed: Dec. 29, 2023

(65) Prior Publication Data
US 2024/0136093 A1    Apr. 25, 2024

Related U.S. Application Data

(63) Continuation of application No. PCT/JP2022/032713, filed on Aug. 31, 2022.

(30) Foreign Application Priority Data

Nov. 9, 2021 (JP) .................... 2021-182605

(51) Int. Cl.
*H01C 7/04* (2006.01)
*H01C 1/14* (2006.01)

(52) U.S. Cl.
CPC ........... *H01C 7/043* (2013.01); *H01C 1/1413* (2013.01)

(58) Field of Classification Search
CPC ........... H01G 4/30; H01G 4/232; H01C 7/041
See application file for complete search history.

(56) References Cited

U.S. PATENT DOCUMENTS 6,232,867 B1 * 5/2001 Yoshida ............... H01C 17/285
338/21
2013/0250480 A1    9/2013 Ahn et al.
2017/0330673 A1    11/2017 Sato et al.
(Continued)

FOREIGN PATENT DOCUMENTS

JP    2002170736 A    6/2002
JP    2004311676 A    11/2004
(Continued)

OTHER PUBLICATIONS

International Search Report in PCT/JP2022/032713, mailed Nov. 22, 2022, 3 pages.

*Primary Examiner* — Khanh T Nguyen
(74) *Attorney, Agent, or Firm* — ArentFox Schiff LLP (57) ABSTRACT

An electronic component that includes: a base body; wiring inside the base body; a glass film covering an outer surface of the base body; an underlying electrode electrically connected to the wiring and covering a part of the glass film; and a metal layer covering the underlying electrode, wherein the glass film includes an uncovered portion that is not covered with the underlying electrode and separated from an outer edge of the underlying electrode by more than 10 μm, and a boundary portion that is not covered with the underlying electrode and not separated from the outer edge of the underlying electrode by more than 10 μm, and a thickness of the boundary portion is larger than a thickness of the uncovered portion.

16 Claims, 7 Drawing Sheets

(56) References Cited

U.S. PATENT DOCUMENTS

2020/0105478 A1   4/2020  Jo et al.
2022/0172895 A1   6/2022  Lee et al.

FOREIGN PATENT DOCUMENTS

| JP | 2013197586 A | 9/2013 |
| JP | 2017204565 A | 11/2017 |
| JP | 2022085818 A | 6/2022 |

* cited by examiner

ELECTRONIC COMPONENT

CROSS REFERENCE TO RELATED APPLICATIONS

The present application is a continuation of International application No. PCT/JP2022/032713, filed Aug. 31, 2022, which claims priority to Japanese Patent Application No. 2021-182605, filed Nov. 9, 2021, the entire contents of each of which are incorporated herein by reference.

TECHNICAL FIELD

The present invention relates to an electronic component.

BACKGROUND ART

An electronic component described in Japanese Patent Application Laid-Open No. 2004-311676 (hereinafter "Patent Document 1") includes a base body, an internal electrode, a glass film, and an external electrode. The internal electrode is located inside the base body. The glass film covers the outer surface of the base body. The external electrode covers a part of the glass film. The external electrode is electrically connected to the internal electrode.

SUMMARY OF THE INVENTION

In the electronic component described in Patent Document 1, moisture and gas may enter the boundary between the external electrode and the glass film from the edge of the external electrode. Once moisture or the like reaches the boundary between the external electrode and the glass film, it is difficult to release the moisture or the like into the atmosphere, and the moisture or the like remains on the boundary surface between the external electrode and the glass film for a long time. Although the glass film is a material that does not allow moisture or the like to pass therethrough, it is difficult to prevent the moisture or the like from reaching the base body if the glass film is exposed to moisture or the like for a long time.

In order to solve the above problems, the present invention is an electronic component including: a base body; wiring inside the base body; a glass film covering an outer surface of the base body; an underlying electrode electrically connected to the wiring and covering a part of the glass film; and a metal layer covering the underlying electrode, wherein the glass film includes an uncovered portion that is not covered with the underlying electrode and separated from an outer edge of the underlying electrode by more than 10 μm, and a boundary portion that is not covered with the underlying electrode and not separated from the outer edge of the underlying electrode by more than 10 μm, and a thickness of the boundary portion is larger than a thickness of the uncovered portion.

In the above configuration, it is difficult to exactly match the position of the edge of the metal layer with the position of the edge of the underlying electrode. Therefore, there is a high possibility that the boundary portion of the glass film is covered with the metal layer protruding from the underlying electrode. According to the above configuration, if moisture or the like reaches the boundary between the glass film and the metal layer at the boundary portion, the moisture or the like can be inhibited from passing through the boundary portion and reaching the base body as the thickness of the boundary portion is large. It is unlikely that the uncovered portion of the glass film is continuously exposed to moisture for a long time. Therefore, if the thickness of the glass film at the uncovered portion is relatively small, moisture and the like can be sufficiently prevented from reaching the base body.

It is possible to inhibit moisture and the like from reaching the base body.

DETAILED DESCRIPTION OF THE PREFERRED EMBODIMENTS

Figure 1:
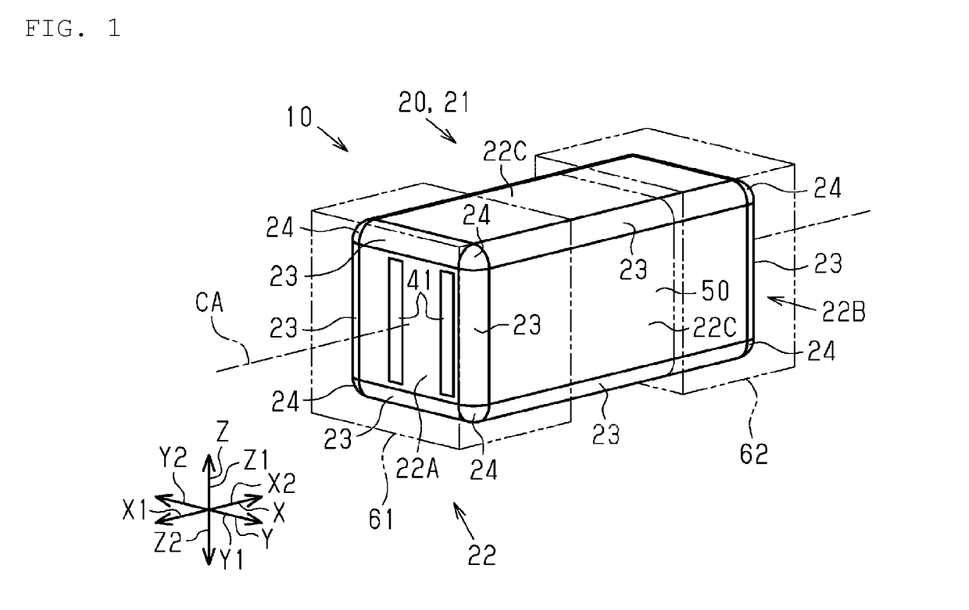
FIG. 1 is a perspective view of an electronic component.

<Embodiment of Electronic Component>
Hereinafter, an embodiment of an electronic component will be described with reference to the drawings. In the drawings, sometimes a component is illustrated while enlarged for the sake of easy understanding. In some cases, a dimension ratio of the component differs from an actual dimension ratio or a dimension ratio of another drawing.
(Overall Configuration)
As shown in FIG. 1, an electronic component 10 is, for example, a surface mount negative characteristic thermistor component mounted on a circuit board or the like. The negative characteristic thermistor component has a characteristic that the resistance value decreases as the temperature increases.

The electronic component 10 includes a base body 20. The base body 20 has a substantially quadrangular prism shape and has a central axis CA. Hereinafter, an axis extending along the central axis CA is defined as a first axis X. One of axes orthogonal to the first axis X is defined as a second axis Y. An axis orthogonal to both the first axis X and the second axis Y is defined as a third axis Z. In addition, one of the directions along the first axis X is defined as a first positive direction X1, and the direction opposite to the first positive direction X1 of the directions along the first axis X is defined as a first negative direction X2. One of the directions along the second axis Y is defined as a second positive direction Y1, and the direction opposite to the second positive direction Y1 of the directions along the second axis Y is defined as a second negative direction Y2. In addition, one of the directions along the third axis Z is defined as a third positive direction Z1, and the direction opposite to the third positive direction Z1 of the directions along the third axis Z is defined as a third negative direction Z2.

An outer surface 21 of the base body 20 has six planar flat faces 22. The term "face" of the base body 20 as used herein refers to a part that can be observed as a face when the entire base body 20 is observed. That is, for example, if there are minute irregularities or steps that cannot be found unless a part of the base body 20 is enlarged and observed with a microscope or the like, the face is expressed as a flat face or a curved face. The six flat faces 22 extend in directions different from each other. The six flat faces 22 are roughly divided into a first end surface 22A facing the first positive direction X1, a second end surface 22B facing the first negative direction X2, and four side surfaces 22C. The four side surfaces 22C are a surface facing the third positive direction Z1, a surface facing the third negative direction Z2, a surface facing the second positive direction Y1, and a surface facing the second negative direction Y2, respectively.

The outer surface 21 of the base body 20 has twelve boundary surfaces 23. The boundary surface 23 includes a curved surface existing at a boundary between the adjacent flat faces 22. That is, the boundary surface 23 includes, for example, a curved surface formed by round chamfering a corner formed by adjacent flat faces 22.

Figure 2:
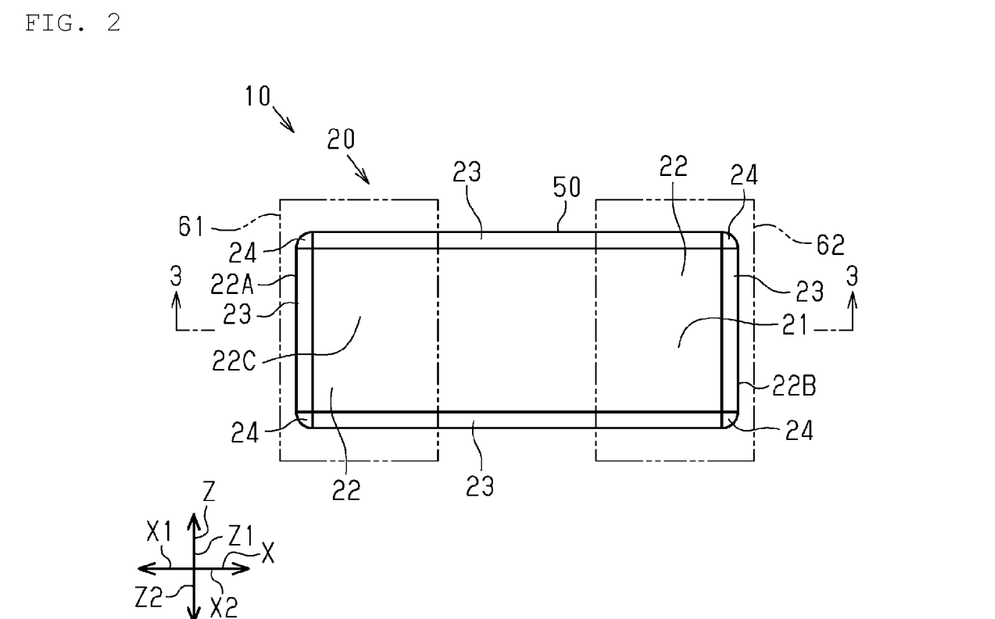
FIG. 2 is a side view of the electronic component.

The outer surface 21 of the base body 20 has eight spherical corner surfaces 24. The corner surface 24 is a boundary part between three adjacent flat faces 22. In other words, the corner surface 24 includes a curved surface at a position where the three boundary surfaces 23 intersect. That is, the corner surface 24 includes, for example, a curved surface formed by round chamfering a corner formed by the three adjacent flat faces 22. In FIGS. 1 and 2, a surface of a glass film 50 to be described later is designated by the same reference numeral as the outer surface 21 of the base body 20.

As illustrated in FIG. 2, in the base body 20, a dimension in the direction along the first axis X is larger than a dimension in the direction along the third axis Z. Furthermore, as illustrated in FIG. 1, in the base body 20, the dimension in the direction along the first axis X is larger than a dimension in the direction along the second axis Y. The material of the base body 20 is a semiconductor. Specifically, the material of the base body 20 is a ceramic obtained by firing a metal oxide containing at least one of Mn, Fe, Ni, Co, Ti, Ba, Al, and Zn as a component.

Figure 3:
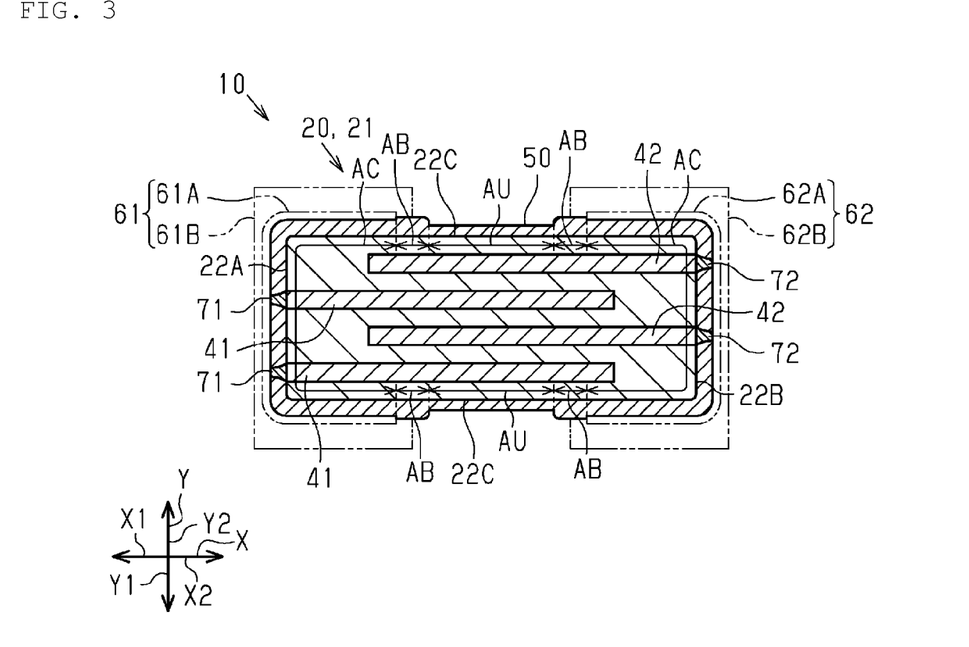
FIG. 3 is a sectional view taken along line 3-3 in FIG. 2.

As illustrated in FIG. 3, the electronic component 10 includes two first internal electrodes 41 and two second internal electrodes 42 as wiring. The first internal electrodes 41 and the second internal electrodes 42 are embedded in the base body 20.

The material of the first internal electrodes 41 is a conductive material. For example, the material of the first internal electrodes 41 is palladium. The material of the second internal electrodes 42 is the same as the material of the first internal electrodes 41.

The first internal electrode 41 has a rectangular plate shape. A principal surface of the first internal electrode 41 is orthogonal to the second axis Y. The second internal electrode 42 has the same rectangular plate shape as the first internal electrode 41. A principal surface of the second internal electrode 42 is orthogonal to the second axis Y, similarly to the first internal electrode 41.

The dimension of the first internal electrode 41 in the direction along the first axis X is smaller than the dimension of the base body 20 in the direction along the first axis X. As illustrated in FIG. 1, the dimension of the first internal electrode 41 in the direction along the third axis Z is approximately ⅔ of the dimension of the base body 20 in the direction along the third axis Z. The dimension of the second internal electrode 42 in each direction is the same as that of the first internal electrode 41.

As illustrated in FIG. 3, the first internal electrodes 41 and the second internal electrodes 42 are located in a staggered manner in the direction along the second axis Y. That is, the first internal electrode 41, the second internal electrode 42, the first internal electrode 41, and the second internal electrode 42 are arranged in this order from the side surface 22C facing the second positive direction Y1 toward the second negative direction Y2. In this embodiment, distances between the internal electrodes in the direction along the second axis Y are equal.

As illustrated in FIG. 1, the two first internal electrodes 41 and the two second internal electrodes 42 are both located at the center of the base body 20 in the direction along the third axis Z. On the other hand, as illustrated in FIG. 3, the first internal electrodes 41 are deviated to the first positive direction X1. The second internal electrodes 42 are deviated to the first negative direction X2.

Specifically, an end of the first internal electrode 41 on the first positive direction X1 side coincides with an end of the base body 20 on the first positive direction X1 side. An end of the first internal electrode 41 on the first negative direction X2 side is located inside the base body 20 and does not reach an end of the base body 20 on the first negative direction X2 side. On the other hand, an end of the second internal electrode 42 on the first negative direction X2 side coincides with an end of the base body 20 on the first negative direction X2 side. An end of the second internal electrode 42 on the first positive direction X1 side is located inside the base body 20 and does not reach an end of the base body 20 on the first positive direction X1 side.

The electronic component 10 includes the glass film 50. The glass film 50 covers the outer surface 21 of the base body 20. In the present embodiment, the glass film 50 covers the entire region of the outer surface 21 of the base body 20. A material of the glass film 50 is glass. In the present embodiment, the glass is made of silicon dioxide.

Figure 4:
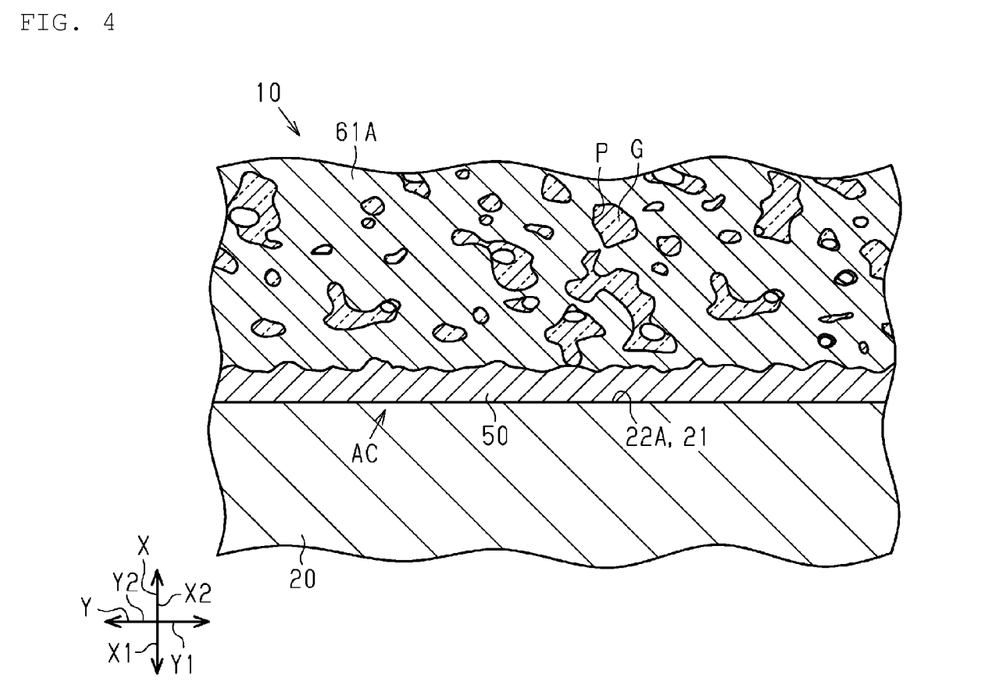
FIG. 4 is an enlarged sectional view of a covered portion.

As shown in FIG. 3, the electronic component 10 includes a first external electrode 61 and a second external electrode 62. The first external electrode 61 includes a first underlying electrode 61A and a first metal layer 61B. The first underlying electrode 61A is stacked on the glass film 50 in a part including the first end surface 22A in the outer surface 21 of the base body 20. That is, the first underlying electrode 61A covers a part of the outer surface 21 of the base body 20. Specifically, the first underlying electrode 61A is a five-face electrode that covers the first end surface 22A of the base body 20 and a portion of four side surfaces 22C on the first positive direction X1 side. In this embodiment, the material of the first underlying electrode 61A is silver and glass. The first underlying electrode 61A is a sintered body. Therefore, as illustrated in FIG. 4, the first underlying electrode 61A includes a large number of hollow pores P. Among the materials constituting the first underlying electrode 61A, a part of glass G exists inside the pores P, but at least a part of the pores P is in a hollow state in which the glass G or the like does not exist. Some of the pores P in the first underlying electrode 61A are in contact with the glass film 50.

As illustrated in FIG. 3, the first metal layer 61B covers the first underlying electrode 61A from the outside. Thus, the first metal layer 61B is stacked on the first underlying electrode 61A. A part of the first metal layer 61B protrudes from the first underlying electrode 61A. That is, a part of the outer edge of the first metal layer 61B directly covers the glass film 50 without the first underlying electrode 61A interposed therebetween. Although not shown in the drawings, the first metal layer 61B has a two-layer structure in which a nickel layer and a tin layer are disposed in order from the first underlying electrode 61A side.

The second external electrode 62 includes a second underlying electrode 62A and a second metal layer 62B. The second underlying electrode 62A is stacked on the glass film 50 in a part including the second end surface 22B in the outer surface 21 of the base body 20. That is, the second underlying electrode 62A covers a part of the outer surface 21 of the base body 20. Specifically, the second underlying electrode 62A is a five-face electrode that covers the second end surface 22B of the base body 20 and a portion of four side surfaces 22C on the first negative direction X2 side. In this embodiment, the material of the second underlying electrode 62A is the same as the material of the first external electrode 61, and is silver and glass. Similarly to the first underlying electrode 61A, the second underlying electrode 62A is a sintered body. Therefore, although not shown in the drawings, the second underlying electrode 62A includes a large number of hollow pores P. Among the materials constituting the second underlying electrode 62A, a part of glass exists inside the pores P, but at least a part of the pores P is in a hollow state in which the glass or the like does not exist. Some of the pores P in the second underlying electrode 62A are in contact with the glass film 50.

The second metal layer 62B covers the second underlying electrode 62A from the outside. Thus, the second metal layer 62B is stacked on the second underlying electrode 62A. A part of the second metal layer 62B protrudes from the second underlying electrode 62A. That is, a part of the outer edge of the second metal layer 62B directly covers the glass film 50 without the second underlying electrode 62A interposed therebetween. Although not shown in the drawings, the second metal layer 62B has, similarly to the first metal layer 61B, a two-layer structure in which a nickel layer and a tin layer are disposed in order from the second underlying electrode 62A side.

The second external electrode 62 does not reach the first external electrode 61 on the side surface 22C, and is disposed away from the first external electrode 61 in the direction along the first axis X. On the side surface 22C of the base body 20, the first external electrode 61 and the second external electrode 62 are not stacked in a central portion in the direction along the first axis X, and the glass film 50 is exposed. In FIGS. 1 to 3, the first external electrode 61 and the second external electrode 62 are indicated by dash-dot-dot lines.

As illustrated in FIG. 3, the first external electrode 61 and the end of the first internal electrode 41 on the first positive direction X1 side are connected via a first penetrating portion 71 penetrating the glass film 50. Thus, the first external electrode 61 is electrically connected to the first internal electrode 41. Although details will be described later, the first penetrating portion 71 is formed as a result of extension of palladium constituting the first internal electrode 41 toward the first external electrode 61 in the process of manufacturing the electronic component 10.

The second external electrode 62 and the end of the second internal electrode 42 on the first negative direction X2 side are connected via a second penetrating portion 72 penetrating the glass film 50. Thus, the second external electrode 62 is electrically connected to the second internal electrode 42. Similarly to the first penetrating portion 71, the second penetrating portion 72 is formed as a result of extension of palladium constituting the first internal electrode 41 toward the second external electrode 62 in the process of manufacturing the electronic component 10. In FIG. 3, the first internal electrode 41 and the first penetrating portion 71 are illustrated as separate members having a boundary; however, actually, there is no clear boundary therebetween. In this respect, the same applies to the second penetrating portion 72. In FIG. 1, illustration of the first penetrating portion 71 is omitted.

(Thickness of Glass Film)

As illustrated in FIG. 3, the glass film 50 includes a covered portion AC, an uncovered portion AU, and a boundary portion AB.

As illustrated in FIG. 4, the covered portion AC is a portion of the glass film 50 covered with the first underlying electrode 61A or the second underlying electrode 62A. In FIG. 4, the covered portion AC covered with the first underlying electrode 61A is illustrated. The thickness of the covered portion AC is calculated as follows. First, a section orthogonal to the first end surface 22A and one side surface 22C is photographed with an electron microscope. Next, a range of the covered portion AC in a direction along the outer surface 21 in the captured image is specified. In this range, the sectional area of the glass film 50 is calculated by image processing in a measurement range of at least 5 μm or more. Then, the calculated sectional area of the glass film 50 in the measurement range is divided by the length that is the measurement range to calculate the thickness of the covered portion AC. That is, the thickness of the covered portion AC is the average thickness in the measurement range.

Figure 5:
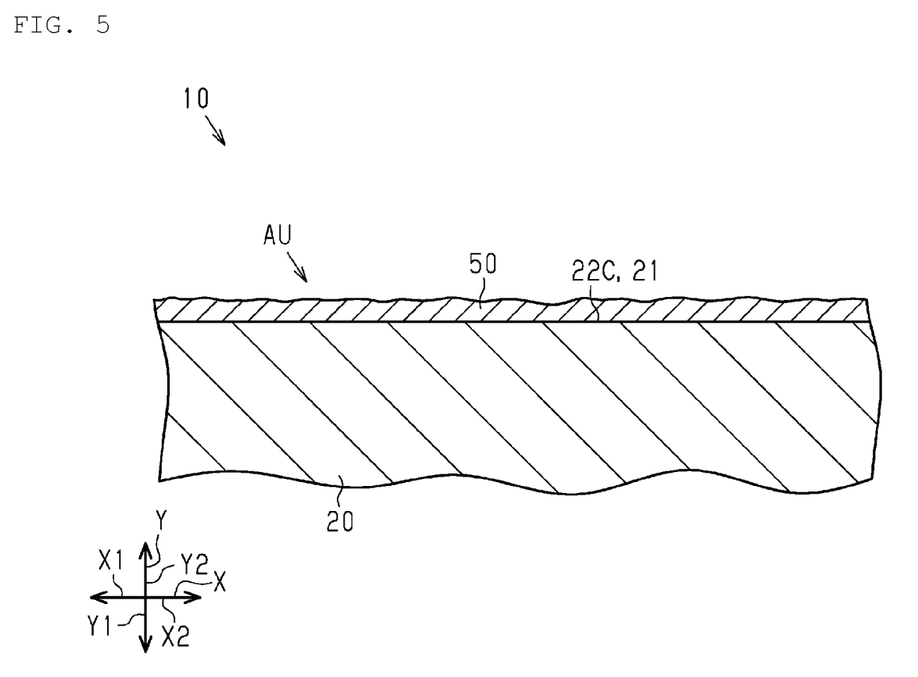
FIG. 5 is an enlarged sectional view of an uncovered portion.

As illustrated in FIG. 5, the uncovered portion AU is a portion of the glass film 50 that is not covered with either the first underlying electrode 61A or the second underlying electrode 62A and is separated from both the outer edge of the first underlying electrode 61A and the outer edge of the second underlying electrode 62A by more than 10 μm. The thickness of the uncovered portion AU is calculated as follows. First, a section orthogonal to one side surface 22C and parallel to the first axis X is photographed with an electron microscope. Next, a range of the uncovered portion AU in a direction along the outer surface 21 in the captured image is specified. In this range, the sectional area of the glass film 50 is calculated by image processing in a measurement range with the same length as in the measurement of the thickness of the covered portion AC. The position of the measurement range of the uncovered portion AU is determined such that the center of the uncovered portion AU in the direction along the first axis X is the center of the measurement range of the uncovered portion AU in the direction along the first axis X. Then, the calculated sectional area of the glass film 50 in the measurement range is divided by the length that is the measurement range to calculate the thickness of the uncovered portion AU. That is, the thickness of the uncovered portion AU is the average thickness in the measurement range.

Figure 6:
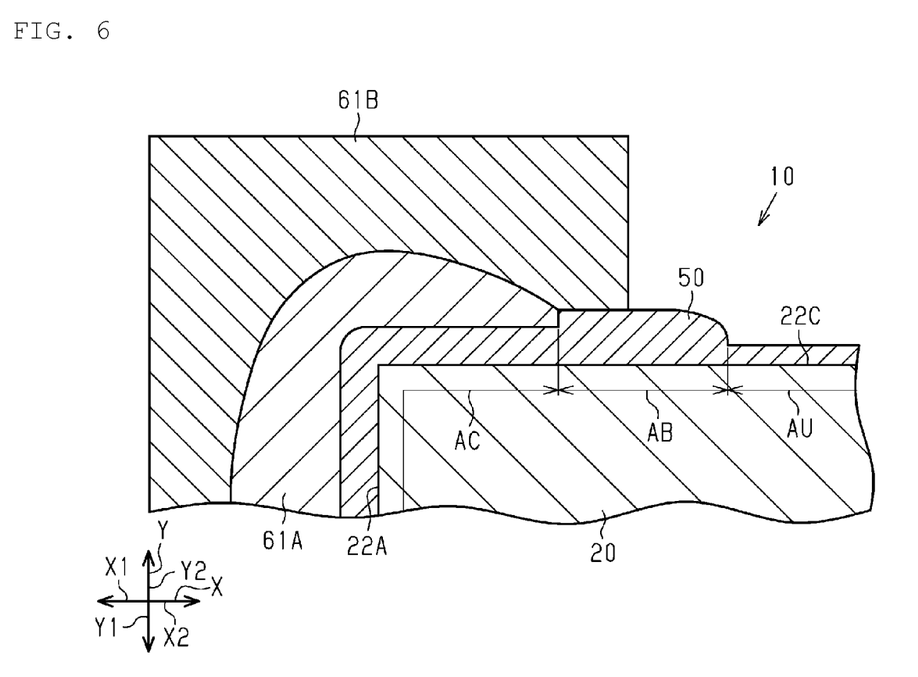
FIG. 6 is an enlarged sectional view of a boundary portion.

Further, the boundary portions AB exist near the first underlying electrode 61A and near the second underlying electrode 62A. That is, as shown in FIG. 6, one of the two boundary portions AB is a portion of the glass film 50 that is not covered with the first underlying electrode 61A and is not separated from the outer edge of the first underlying electrode 61A by more than 10 μm. The other one of the two boundary portions AB is a portion of the glass film 50 that is not covered with the second underlying electrode 62A and is not separated from the outer edge of the second underlying electrode 62A by more than 10 μm. The thickness of the boundary portion AB is calculated as follows. First, a section orthogonal to one side surface 22C and parallel to the first axis X is photographed with an electron microscope. Next, a range of the boundary portion AB in a direction along the outer surface 21 in the captured image is specified. This range measures 10 μm. In this range of 10 μm, the sectional area of the glass film 50 is calculated by image processing. Then, the calculated sectional area of the glass film 50 in the range is divided by 10 μm, which is the length of the measurement range, to calculate the thickness of the boundary portion AB. That is, the thickness of the boundary portion AB is the average thickness of the entire boundary portion AB.

As illustrated in FIG. 6, the thickness of the covered portion AC is larger than the thickness of the uncovered portion AU. The thickness of the boundary portion AB is larger than the thickness of the covered portion AC. That is, the thickness of the covered portion AC is smaller than the thickness of the boundary portion AB. The thickness of the uncovered portion AU is 30 nm or more. The thickness of the boundary portion AB is 1,000 nm or less.

Furthermore, the coefficient of variation of the thickness of the covered portion AC is larger than the coefficient of variation of the thickness of the uncovered portion AU. That is, in the covered portion AC, the surface is uneven as compared with the uncovered portion AU.

The coefficient of variation of the thickness of each portion is calculated as follows. First, local maximum values of the thickness of the glass film 50 are measured at five points in the measurement range. Next, local minimum values of the glass film 50 are measured at five points in the measurement range. Next, the average value and the standard deviation of the thicknesses at a total of 10 points are calculated. Then, the standard deviation is divided by the average value of the thicknesses at 10 points to calculate the coefficient of variation.

(Method of Manufacturing Electronic Component)

Next, a method of manufacturing the electronic component 10 will be described.

Figure 7:
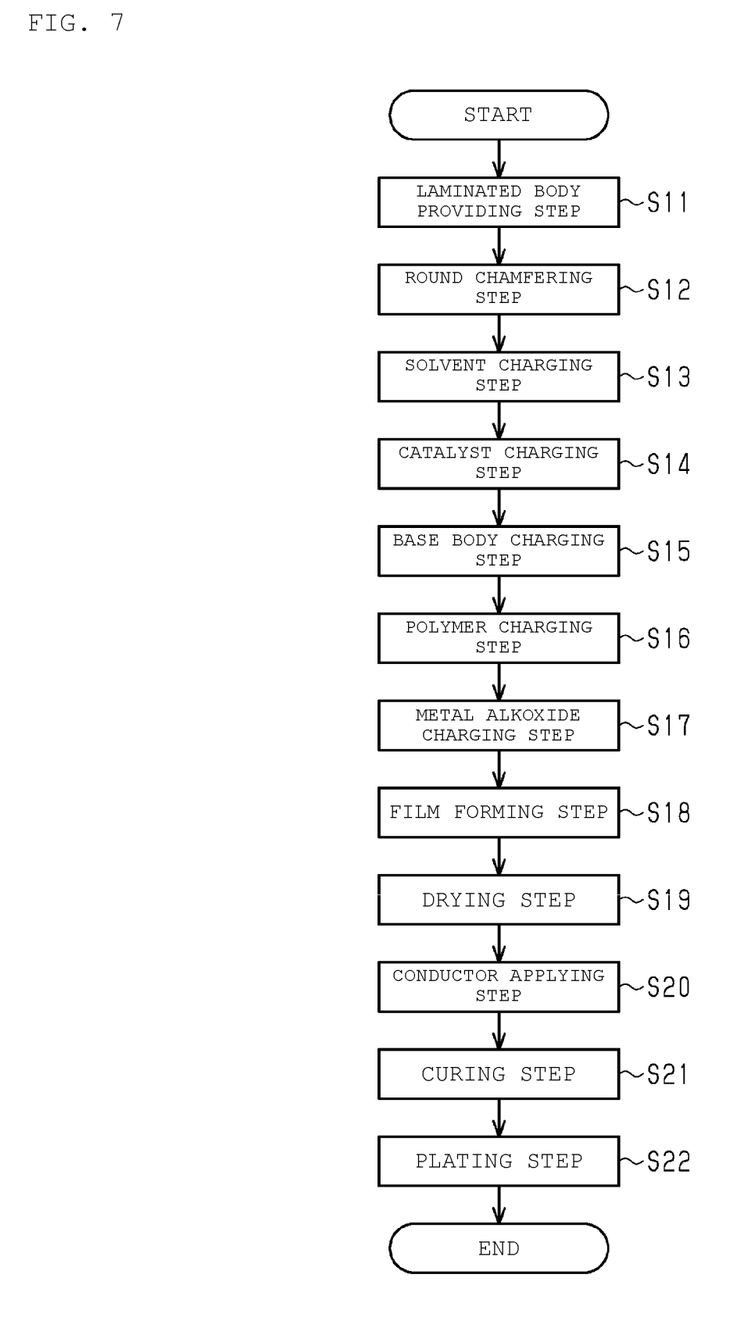
FIG. 7 is an explanatory diagram illustrating a method of manufacturing an electronic component.

As illustrated in FIG. 7, the method of manufacturing the electronic component 10 includes a laminated body providing step S11, a round chamfering step S12, a solvent charging step S13, a catalyst charging step S14, a base body charging step S15, a polymer charging step S16, and a metal alkoxide charging step S17. The method of manufacturing the electronic component 10 further includes a film forming step S18, a drying step S19, a conductor applying step S20, a curing step S21, and a plating step S22.

First, when the base body 20 is formed, in the laminated body providing step S11, a laminated body that is the base body 20 not having the boundary surfaces 23 or the corner surfaces 24 is provided. That is, the laminated body is in a state before round chamfering, and has a rectangular parallelepiped shape having the six flat faces 22. For example, first, a plurality of ceramic sheets to be the base body 20 are provided. Each of the sheets has a thin plate shape. A conductive paste to be the first internal electrode 41 is stacked on the sheet. A ceramic sheet to be the base body 20 is stacked on the laminated paste. A conductive paste to be the second internal electrode 42 is stacked on the sheet. In this manner, the ceramic sheet and the conductive paste are stacked. Then, an unfired laminated body is formed by cutting into a predetermined size. Thereafter, the unfired laminated body is fired at a high temperature to provide a laminated body.

Next, the round chamfering step S12 is performed. In the round chamfering step S12, the boundary surfaces 23 and the corner surfaces 24 are formed on the laminated body provided in the laminated body providing step S11. For example, a corner of the laminated body is round-chamfered by barrel polishing, whereby the boundary surface 23 having a curved surface and the corner surface 24 having a curved surface are formed. Thus, the base body 20 is formed.

Figure 8:
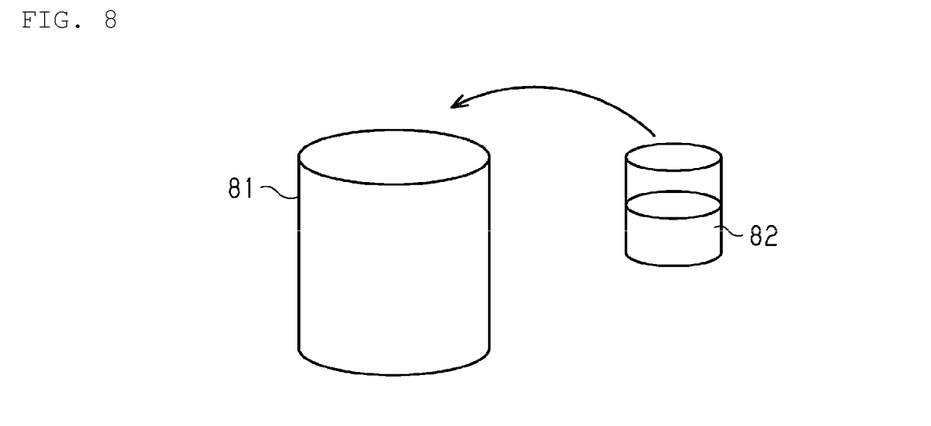
FIG. 8 is an explanatory diagram illustrating the method of manufacturing an electronic component.

Next, the solvent charging step S13 is performed. As illustrated in FIG. 8, in the solvent charging step S13, 2-propanol is charged as a solvent 82 into a reaction vessel 81.

Figure 9:
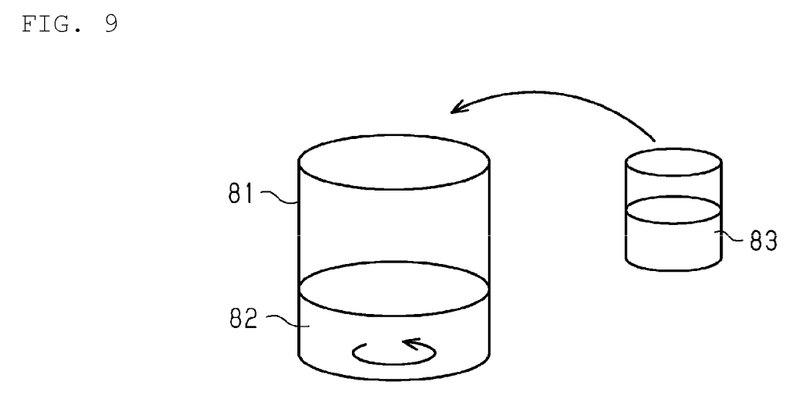
FIG. 9 is an explanatory diagram illustrating the method of manufacturing an electronic component.

Next, as illustrated in FIG. 7, the catalyst charging step S14 is performed. As illustrated in FIG. 9, in the catalyst charging step S14, first, stirring of the solvent 82 in the reaction vessel 81 is started. Then, ammonia water as an aqueous solution 83 containing a catalyst is charged into the reaction vessel 81. The catalyst in this embodiment is a hydroxide ion, and functions as a catalyst that promotes hydrolysis of a metal alkoxide 85 described later.

Figure 10:
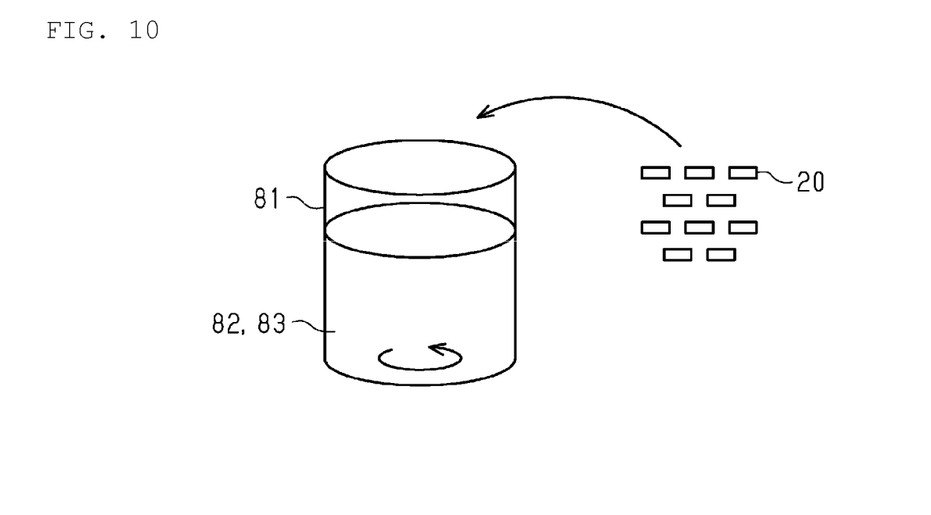
FIG. 10 is an explanatory diagram illustrating the method of manufacturing an electronic component.

Next, as illustrated in FIG. 7, the base body charging step S15 is performed. As illustrated in FIG. 10, in the base body charging step S15, the plurality of base bodies 20 formed in advance in the round chamfering step S12 as described above are charged into the reaction vessel 81.

Figure 11:
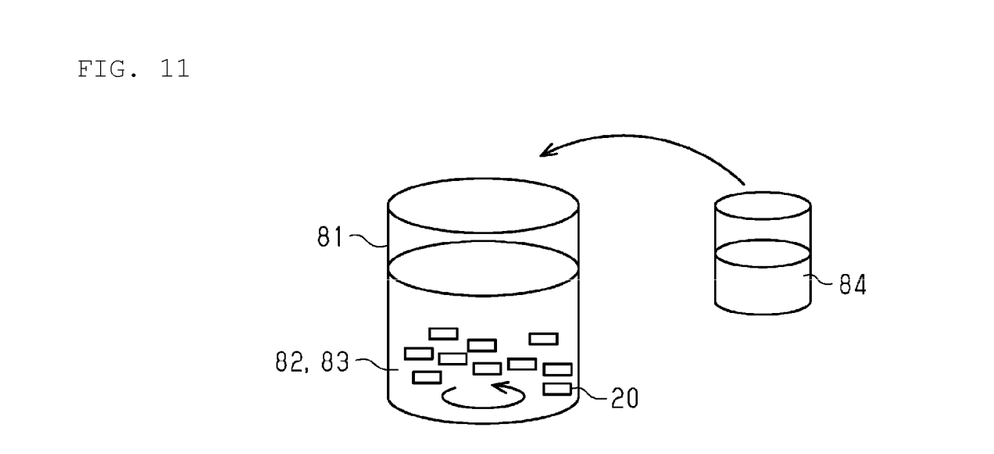
FIG. 11 is an explanatory diagram illustrating the method of manufacturing an electronic component.

Next, as illustrated in FIG. 7, the polymer charging step S16 is performed. As illustrated in FIG. 11, in the polymer charging step S16, polyvinylpyrrolidone is charged as a polymer 84 into the reaction vessel 81. As a result, the polymer 84 charged into the reaction vessel 81 is adsorbed to the outer surfaces 21 of the base bodies 20.

Figure 12:
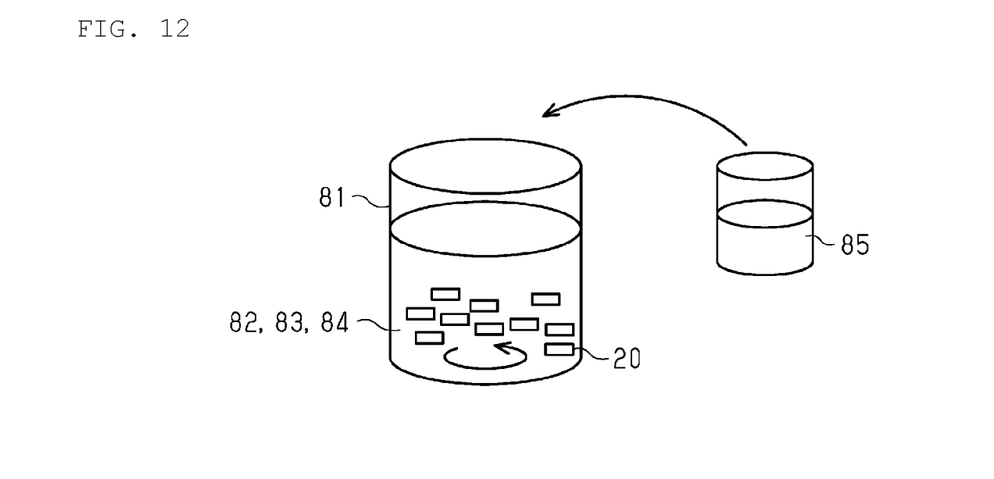
FIG. 12 is an explanatory diagram illustrating the method of manufacturing an electronic component.

Next, as illustrated in FIG. 7, the metal alkoxide charging step S17 is performed. As illustrated in FIG. 12, in the metal alkoxide charging step S17, tetraethyl orthosilicate in a liquid state is charged as the metal alkoxide 85 into the reaction vessel 81. Tetraethyl orthotetrasilicate is sometimes referred to as tetraethoxysilane. In the present embodiment, the amount of the metal alkoxide 85 to be charged in the metal alkoxide charging step S17 is calculated based on the area of the outer surfaces 21 of the base bodies 20 charged in the base body charging step S15. Specifically, the calculation is performed by multiplying the amount of the metal alkoxide 85 per one base body 20 necessary for forming the glass film 50 covering the outer surface 21 of the base body 20 by the number of base bodies 20.

Next, as illustrated in FIG. 7, the film forming step S18 is performed. In the film forming step S18, the stirring of the solvent 82 started in the solvent charging step S13 described above is continued for a predetermined time after the metal alkoxide 85 is charged into the reaction vessel 81 in the metal alkoxide charging step S17. In the film forming step S18, the glass film 50 is formed by a liquid phase reaction in the reaction vessel 81.

Next, the drying step S19 is performed. In the drying step S19, after the stirring is continued for the predetermined time in the film forming step S18, the base body 20 is taken out from the reaction vessel 81 and dried. As a result, the sol-like glass film 50 is dried to become a gel-like glass film 50.

Next, the conductor applying step S20 is performed. In the conductor applying step S20, a conductor paste is applied to two portions of the surface of the glass film 50, that is, a portion including a portion covering the first end surface 22A of the base body 20 and a portion including a portion covering the second end surface 22B of the base body 20. Specifically, the conductor paste is applied to cover the glass film 50 on the entire region of the first end surface 22A and a portion of the four side surfaces 22C. Furthermore, the conductor paste is applied to cover the glass film 50 on the entire region of the second end surface 22B and a portion of the four side surfaces 22C.

Next, the curing step S21 is performed. Specifically, in the curing step S21, the glass film 50 and the base body 20 applied with the conductor paste are heated. As a result, water and the polymer 84 are vaporized from the gel-like glass film 50, so that the glass film 50 covering the outer surface 21 of the base body 20 is fired and cured as illustrated in FIG. 3. At the same time, the conductor paste applied in the conductor applying step S20 is fired to form the first underlying electrode 61A and the second underlying electrode 62A. In addition, by heating the conductor paste, a low-melting-point substance among the materials constituting the glass in the conductor paste is allowed to diffuse toward the gel-like glass film 50. As a result, in the glass film 50, the portion covered with the first underlying electrode 61A and the portion covered with the second underlying electrode 62A become thicker than the uncovered portion AU. Furthermore, the low-melting-point substance of glass in the conductor paste overflows from the boundary between the glass film 50 and the conductor paste to reach the boundary portion AB. Since the boundary portion AB is not covered with the first underlying electrode 61A, the boundary portion AB containing the diffused low-melting-point substance has a large thickness and is fired in this state. As a result, the thickness of the boundary portion AB is larger than the thickness of the covered portion AC. Thus, the conductor applying step S20 and the curing step S21 constitute an underlying electrode forming step. As described above, in the present embodiment, the curing step S21 serves not only as a step of curing the glass film 50 but also as a step of sintering the underlying electrodes.

In the present embodiment, at the time of heating in the curing step S21, palladium contained on the first internal electrode 41 side is attracted toward the first underlying electrode 61A containing silver due to the Kirkendall effect caused by a difference in diffusion rate between the first internal electrode 41 and the first underlying electrode 61A. As a result, the first penetrating portion 71 penetrates and extends through the glass film 50 from the first internal electrode 41 toward the first underlying electrode 61A, so that the first internal electrode 41 and the first underlying electrode 61A are connected. In this respect, the same applies to the second penetrating portion 72 connecting the second internal electrode 42 and the second underlying electrode 62A.

Next, the plating step S22 is performed. Electroplating is performed on portions of the first underlying electrode 61A and the second underlying electrode 62A. Specifically, barrel plating is performed. In the barrel plating, the base body 20 provided with the first underlying electrode 61A and the second underlying electrode 62A and a medium are put in a barrel and stirred. As a result, the first metal layer 61B is formed on a surface of the first underlying electrode 61A. At the same time, the medium collides with the uncovered portion AU of the glass film 50, so that the surface of the glass film 50 of the uncovered portion AU is scraped. Therefore, the thickness of the uncovered portion AU is reduced. In addition, the unevenness of the surface of the uncovered portion AU becomes flatter than the state before the barrel plating. On the other hand, the medium does not collide with the boundary portion AB of the glass film 50 because the first metal layer 61B interferes therewith. Therefore, the thickness of the boundary portion AB becomes larger than the thickness of the uncovered portion AU. Furthermore, the thickness of the boundary portion AB remains larger than the thickness of the covered portion AC.

Similarly, the second metal layer 62B is formed on a surface of the second underlying electrode 62A. Although not illustrated, the first metal layer 61B and the second metal layer 62B are electroplated with two kinds of metals, nickel and tin, to form a two-layer structure. In this way, the electronic component 10 is formed.

(Operation and Effect of Embodiment)

(1) In the above embodiment, a part of the outer edge of the first metal layer 61B directly covers the glass film 50. The first metal layer 61B has lower adhesion to the glass film 50 than the first underlying electrode 61A containing glass. Therefore, moisture may enter between the outer edge of the first metal layer 61B and the glass film 50, and the glass film 50 may be exposed to moisture for a long time. According to the above embodiment, in the glass film 50, the thickness of a portion that is highly likely to be directly covered with the first metal layer 61B, that is, the boundary portion AB, is larger than the thickness of the uncovered portion AU. If moisture enters between the outer edge of the first metal layer 61B and the glass film 50, the moisture can be inhibited from reaching the base body 20 because the thickness of the boundary portion AB is large. Although the first metal layer 61B has been described as an example, the same applies to the second metal layer 62B.

(2) In the above embodiment, the thickness of the boundary portion AB is larger than the thickness of the covered portion AC. That is, the thickness of the covered portion AC is smaller than the thickness of the boundary portion AB. By reducing the thickness of the glass film 50 covered with each underlying electrode, it is possible to prevent the electronic component 10 from becoming large as a whole.

(3) According to the above embodiment, in the glass film 50, the thickness of the uncovered portion AU having the smallest thickness among the covered portion AC, the boundary portion AB, and the uncovered portion AU is 30 nm or more. Therefore, a sufficient thickness for protecting the base body 20 can be secured at a portion not covered with the first underlying electrode 61A.

(4) According to the above embodiment, in the glass film 50, the thickness of the boundary portion AB having the largest thickness among the covered portion AC, the boundary portion AB, and the uncovered portion AU is 1,000 nm or less. Therefore, it is possible to prevent the electronic component 10 from becoming large as a whole due to the excessively large thickness of the boundary portion AB.

(5) In the above embodiment, the first underlying electrode 61A and the second underlying electrode 62A have an infinite number of pores P. In addition, fine cracks may be formed in the first underlying electrode 61A and the second underlying electrode 62A in the manufacturing process and after the manufacturing of the electronic component 10. Therefore, depending on the use environment of the electronic component 10, moisture adhering to the electronic component 10 may enter the inside of the pores P and the cracks. Furthermore, when the pores P and the cracks reach the glass film 50, moisture present inside the pores P and the cracks comes into contact with the glass film 50. If fine cracks are formed in the glass film 50, moisture may reach the base body 20 through the cracks.

In the above embodiment, the thickness of the covered portion AC is larger than the thickness of the uncovered portion AU. Therefore, for example, if moisture or the like reaches the boundary between the glass film 50 and each underlying electrode depending on the use environment of the electronic component 10, the moisture or the like can be inhibited from reaching the base body 20 because the thickness of the covered portion AC in the glass film 50 is large. Since the uncovered portion AU of the glass film 50 is not covered with the first external electrode 61, if moisture adheres thereto, the moisture is volatilized to the atmosphere. That is, it is unlikely that the uncovered portion AU is continuously exposed to moisture for a long time. Therefore, if the thickness of the uncovered portion AU of the glass film 50 is relatively small, moisture and the like can be sufficiently prevented from reaching the base body 20.

(6) In the above embodiment, the coefficient of variation of the thickness of the covered portion AC is larger than the coefficient of variation of the thickness of the uncovered portion AU. That is, in the covered portion AC of the glass film 50, the surface is uneven as compared with the uncovered portion AU. Therefore, the adhesion to each underlying electrode can be enhanced in the covered portion AC. As a result, it is easy to prevent moisture or the like from accumulating between each underlying electrode and the glass film 50.

(7) In the above embodiment, each underlying electrode contains glass. Therefore, when the glass in the conductor paste is melted in forming each underlying electrode as in the manufacturing method of the embodiment, the low-melting-point substance of the glass is diffused into the glass film 50. Thus, the thickness of the covered portion AC can be easily increased.

(8) In the above embodiment, each underlying electrode contains is a sintered body containing silver. The sintered body has a large number of hollow pores P therein. Therefore, moisture and gas are likely to accumulate inside the pores P in the underlying electrode that is a sintered body. Therefore, there is a high possibility that moisture accumulates at the boundary between the underlying electrode and the glass film 50. Based on the premise of such a configuration of the underlying electrode, adopting a configuration in which the thickness of the covered portion AC is larger than the thickness of the uncovered portion AU is preferable in that moisture or the like can be effectively inhibited from reaching the base body 20.

(9) In the above embodiment, the whole outer surface 21 of the base body 20 is covered with the glass film 50, the first underlying electrode 61A, or the second underlying electrode 62A. Therefore, moisture and gas can be prevented from entering the base body 20 from the outside of the electronic component 10 in all regions of the outer surface 21.

<Other Embodiments>

The above embodiment can be modified as below and be implemented. The above embodiment and the following modification can be implemented in combination within a range not technically contradictory.

In the above embodiment, the electronic component 10 is not limited to the negative characteristic thermistor component. For example, the electronic component 10 may be a thermistor component other than those having a negative characteristic, a multilayer capacitor component, or an inductor component as long as the inside of the base body 20 is provided with some wiring.

The shape of the base body 20 is not limited to the example of the above embodiment. For example, the base body 20 may have a polygonal columnar shape, other than a quadrangular columnar shape, having the central axis CA. Furthermore, the base body 20 may be a core of a wire-wound inductor component. For example, the core may have what is called a drum core shape. Specifically, the core may have a columnar winding core portion and a flange portion provided at each end of the winding core portion.

The material of the base body 20 is not limited to the example of the above embodiment. For example, the material of the base body 20 may be a composite of a resin and a metal powder.

The outer surface 21 of the base body 20 may not have the boundary surfaces 23 or the corner surfaces 24. For example, when a boundary between the adjacent flat faces 22 of the outer surface 21 of the base body 20 does not have a chamfered shape, there is no curved surface at the boundary. Therefore, in some of such a case, neither the boundary surface 23 nor the corner surface 24 exists.

On the outer surface 21 of the base body 20, there may be a portion that is not covered with any of the glass film 50, the first underlying electrode 61A, and the second underlying electrode 62A. For example, a part of the side surfaces 22C may not be covered with the glass film 50 but may be covered with an insulating resin or the like different from the glass film 50. Examples of such an insulating resin include a resin that is colored in order to optically identify the orientation of the base body 20.

In the above embodiment, the shapes of the first internal electrode 41 and the second internal electrode 42 are not limited as long as they can ensure electrical conduction with the corresponding first external electrode 61 and second external electrode 62. The number of the first internal electrodes 41 and the number of the second internal electrodes 42 are not limited, and the number of the internal electrodes may be one or may be three or more.

The first metal layer 61B may not have a two-layer structure. For example, the first metal layer 61B may include only one layer of a nickel layer or a tin layer, or may have a structure including three or more layers. In this respect, the same applies to the second metal layer 62B.

The method of manufacturing the first metal layer 61B and the second metal layer 62B is not limited to barrel plating. For example, the first metal layer 61B and the second metal layer 62B may be manufactured by electroless plating. Furthermore, the first metal layer 61B and the second metal layer 62B may be manufactured by a method other than plating. Regardless of the method of manufacturing the metal layer, it is difficult to exactly match the position of the edge of the underlying electrode with the position of the edge of the metal layer. That is, regardless of the method of manufacturing the metal layer, the metal layer may protrude from the underlying electrode. Therefore, no matter how the metal layer is manufactured, there is the problem that moisture or the like easily enters the boundary between the metal layer and the glass film 50.

The material of the first underlying electrode 61A is not limited to the example of the above embodiment. For example, the material of the first underlying electrode 61A may be copper or gold. The material of the first underlying electrode 61A may not contain glass. For example, the material of the first underlying electrode 61A may be made only of metal.

The first underlying electrode 61A may not be a sintered body. For example, the first underlying electrode 61A may be a single crystal.

In the above embodiment, the material combination of the first internal electrode 41 and the first underlying electrode 61A is not limited to the combination of palladium and silver. For example, a combination of copper and nickel, copper and silver, silver and gold, nickel and cobalt, or nickel and gold may be used. For example, one may be silver, and the other may be a combination of silver and palladium. For example, one may be palladium and the other may be a combination of silver and palladium, or one may be copper and the other may be a combination of silver and palladium. For example, one may be gold, and the other may be a combination of silver and palladium.

Depending on the combination of the first internal electrode 41 and the first underlying electrode 61A, the Kirkendall effect may not be obtained. In this case, before an external electrode forming step, for example, the first end surface 22A side of the base body 20 only needs to be polished to physically remove a portion of the glass film 50 so that the first internal electrode 41 is exposed. Thereafter, the first internal electrode 41 and the first underlying electrode 61A can be connected by performing the underlying electrode forming step. Alternatively, for example, after the first underlying electrode 61A is formed, the glass film 50 may be formed on a region including the surface of the first underlying electrode 61A, and the glass film 50 covering the surface of the first underlying electrode 61A may be removed. In this respect, the same applies to the material combination of the second internal electrode 42 and the second underlying electrode 62A.

The arrangement place of the first external electrode 61 is not limited to the example of the above embodiment. For example, the first external electrode 61 may be disposed only on the first end surface 22A and one side surface 22C. In this respect, the same applies to the second external electrode 62.

In the glass film 50, it is sufficient that at least one of the thickness of the boundary portion AB on the first external electrode 61 side and the thickness of the boundary portion AB on the second external electrode 62 side be larger than the thickness of the uncovered portion AU.

As for the thickness of the glass film 50, it is sufficient that the thickness of the boundary portion AB is larger than the thickness of the uncovered portion AU, and the thickness of the covered portion AC may be equal to or smaller than the thickness of the uncovered portion AU. The thickness of the covered portion AC may be equal to or larger than the thickness of the boundary portion AB. Further, the thickness of the boundary portion AB may be larger than 1,000 nm, and the thickness of the uncovered portion AU may be smaller than 30 nm.

The coefficient of variation of the thickness of the covered portion AC may be equal to or less than the coefficient of variation of the thickness of the uncovered portion AU. For example, in the case where the first underlying electrode 61A is formed by bonding a metal foil, the surface of the covered portion AC in the glass film 50 may not have unevenness due to diffusion of the low-melting-point substance. In the case where the first metal layer 61B is plated without using the barrel, the surface of the uncovered portion AU is not flattened by the barrel. Also in these cases, as long as the thickness of the covered portion AC is larger than the thickness of the uncovered portion AU, the coefficient of variation of the thickness of the covered portion AC may be equal to or smaller than the coefficient of variation of the thickness of the uncovered portion AU.

Figure 13:
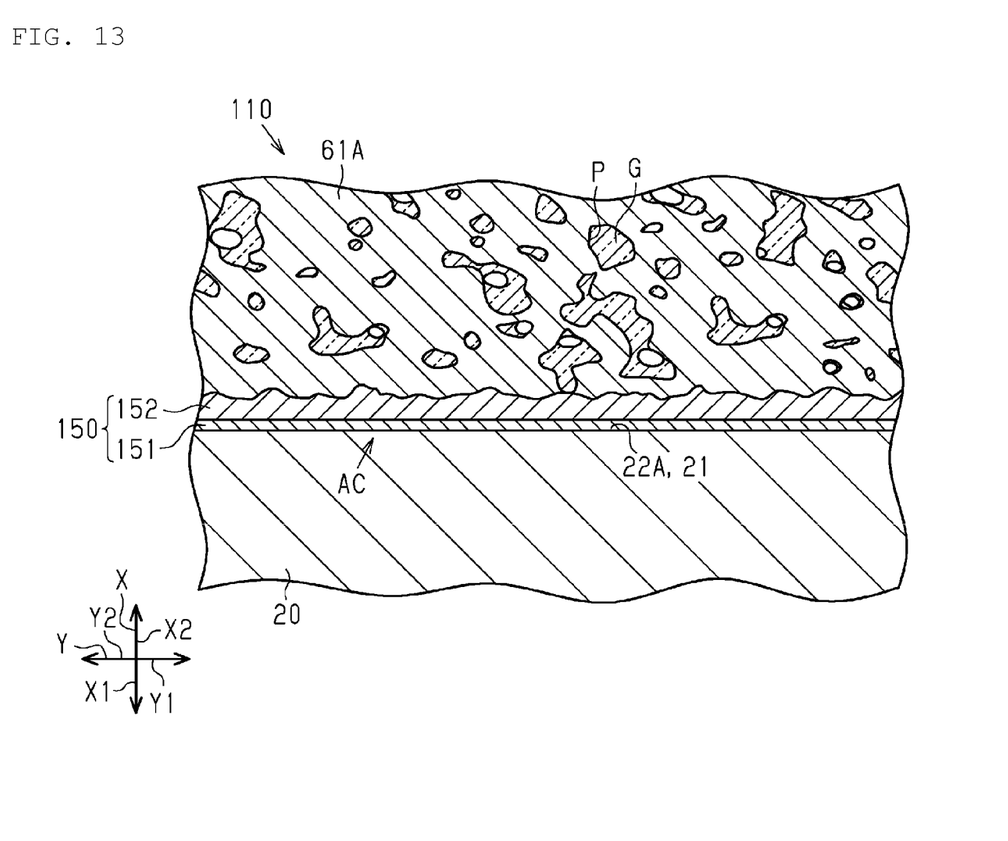
FIG. 13 is an enlarged sectional view of a covered portion of an electronic component according to a modification.

Furthermore, for example, in an electronic component 110 of a modification illustrated in FIG. 13, a glass film 150 includes a pure glass layer 151 and a diffusion layer 152. The pure glass layer 151 is stacked on the outer surface 21 of the covered portion AC. Here, the material of the first underlying electrode 61A is silver and glass. Furthermore, the glass of the first underlying electrode 61A contains an alkali metal and an alkaline earth metal as additives. On the other hand, the pure glass layer 151 does not contain the metal components of the first underlying electrode 61A. Therefore, in this modification, the pure glass layer 151 does not contain silver, the alkali metal, or the alkaline earth metal. Specifically, the pure glass layer 151 consists only of silicon dioxide. In the glass film 150, the minimum thickness of the covered portion AC is 10 nm or more. The minimum thickness is calculated as follows. First, a section orthogonal to the first end surface 22A and one side surface 22C is photographed with an electron microscope. Next, in the photographed image, a position where the thickness of the glass film 150 is minimum is specified. Then, the thickness at the specified position is measured on the image. The thickness measured in this manner is defined as the minimum thickness of the covered portion AC in the glass film 150.

Suppose that the entire glass film contains the metal components of the first underlying electrode 61A. In this case, in the curing step S21 of the manufacturing process, the metal components in the glass film enter the base body 20 beyond the outer surface 21. More specifically, the case where the metal component contained in the glass film is silver and the base body 20 contains manganese will be described as an example. In this case, the crystal structure in the vicinity of the outer surface 21 of the base body 20 changes from a state of being composed of manganese and oxygen to a state in which silver is also added. Therefore, the silver entering the base body 20 is constrained by the base body 20. Since silver is diffused in the glass film, the silver that has entered the base body 20 is connected to silver in the conductor paste via the silver in the glass film. Therefore, the silver in the conductor paste is correspondingly constrained to the base body 20 side via the silver in the glass film. As a result, the silver in the conductor paste is less likely to gather in the curing step S21. When the silver in the conductor paste hardly gathers, there is a possibility that the sintering time becomes long.

In this respect, in the electronic component 110 of the modification, the pure glass layer 151 does not contain the metal components of the first underlying electrode 61A. That is, silver does not enter the vicinity of the outer surface 21 in the inside of the base body 20. Therefore, if silver to be the first underlying electrode 61A is diffused into the glass film 150 in the curing step S21 of the manufacturing process, the silver is not constrained to the base body 20 side by the layer having the crystal structure in which the silver has entered the base body 20. Therefore, as described above, the silver in the conductor paste does not become difficult to move due to the layer. Therefore, the silver in the conductor paste is prevented from being less likely to gather and thus becoming difficult to sinter, and thus it is possible to prevent the sintering time from becoming excessively long.

According to the electronic component 110 of the above modification, the pure glass layer 151 consists only of silicon dioxide. Therefore, if the first underlying electrode 61A contains an additive, it is possible to prevent the alkali metal and the alkaline earth metal, which are components of the additive, from excessively diffusing into the glass film 150.

Furthermore, in the electronic component 110 of the above-described modification, the minimum thickness of the covered portion AC in the glass film 150 is 10 nm or more. Therefore, if an adequate amount of the metal component contained in the conductor paste is diffused into the glass film 150 in the curing step S21 of the manufacturing process, the pure glass layer 151 not containing the metal component is still present in a part on the outer surface 21 side. Therefore, stable manufacture of the pure glass layer 151 is facilitated.

In the electronic component 110 of the modification illustrated in FIG. 13, as long as the pure glass layer 151 is included in the glass film 150, the minimum thickness of the covered portion AC of the glass film 150 may be less than 10 nm.

In addition, in the electronic component 110 of the modification illustrated in FIG. 13, the pure glass layer 151 is not limited to only silicon dioxide. For example, in the case where the glass of the glass film 150 contains boron oxide as a main component, the pure glass layer 151 may contain only boron oxide.

Furthermore, in the electronic component 110 of the modification illustrated in FIG. 13, the glass film 150 may be constituted only of the pure glass layer 151.

DESCRIPTION OF REFERENCE SYMBOLS 10, 110: Electronic component
20: Base body
21: Outer surface
41: First internal electrode
42: Second internal electrode
50: Glass film
61: First external electrode
62: Second external electrode
71: First penetrating portion
72: Second penetrating portion
81: Reaction vessel
82: Solvent
83: Aqueous solution
84: Polymer
85: Metal alkoxide
151: Pure glass layer

The invention claimed is:

1. An electronic component comprising:
a base body;
wiring inside the base body;
a glass film covering an outer surface of the base body;
an underlying electrode electrically connected to the wiring and covering a part of the glass film; and
a metal layer covering the underlying electrode,
wherein the glass film includes an uncovered portion that is not covered with the underlying electrode and separated from an outer edge of the underlying electrode by more than 10 μm and less than a length dimension of the base body, and a boundary portion that is not covered with the underlying electrode and within 10 μm from the outer edge of the underlying electrode, and a thickness of the boundary portion is larger than a thickness of the uncovered portion.

2. The electronic component according to claim 1, wherein the glass film includes a covered portion that is covered with the underlying electrode, and a thickness of the covered portion is smaller than the thickness of the boundary portion.

3. The electronic component according to claim 2, wherein the thickness of the uncovered portion is smaller than the thickness of the covered portion and smaller than the thickness of the boundary portion.

4. The electronic component according to claim 2, wherein a coefficient of variation of the thickness of the covered portion is larger than a coefficient of variation of the thickness of the uncovered portion.

5. The electronic component according to claim 2, wherein
the thickness of the uncovered portion is 30 nm or more, and
the thickness of the boundary portion is 1,000 nm or less.

6. The electronic component according to claim 1, wherein
the thickness of the uncovered portion is 30 nm or more, and
the thickness of the boundary portion is 1,000 nm or less.

7. The electronic component according to claim 1, wherein the underlying electrode contains glass.

8. The electronic component according to claim 7, wherein the underlying electrode includes pores.

9. The electronic component according to claim 8, wherein at least some of the pores of the underlying electrode include the glass.

10. The electronic component according to claim 1, wherein the underlying electrode is a sintered body containing silver.

11. The electronic component according to claim 1, wherein a whole of the outer surface is covered with the glass film or the underlying electrode.

12. The electronic component according to claim 1, wherein the glass film includes a pure glass layer containing no metal component of the underlying electrode, and the pure glass layer is stacked on the outer surface in a covered portion of the glass film covered with the underlying electrode.

13. The electronic component according to claim 12, wherein the pure glass layer consists only of silicon dioxide.

14. The electronic component according to claim 12, wherein a minimum thickness of the covered portion of the glass film is 10 nm.

15. The electronic component according to claim 12, wherein the glass film further includes a diffusion layer on the pure glass layer.

16. The electronic component according to claim 1, wherein the glass film is a pure glass layer.

* * * * *